United States Patent [19]

Sherman

[11] 4,191,074
[45] Mar. 4, 1980

[54] CHAIN SAW BAR GUIDE ALIGNMENT SYSTEM

[76] Inventor: William E. Sherman, P.O. Box 95, Silver City, N. Mex. 88061

[21] Appl. No.: 912,054

[22] Filed: Jun. 2, 1978

[51] Int. Cl.$^2$ .............................................. B23D 63/18
[52] U.S. Cl. ....................................... 76/25 R; 72/479
[58] Field of Search .................. 76/25 R, 112, 83, 51, 76/54, 56; 72/479; 30/383, 387

[56] References Cited

U.S. PATENT DOCUMENTS

| 493,174 | 3/1893 | McClure | 76/83 |
| 1,006,940 | 10/1911 | Haynes | 76/83 |
| 2,948,309 | 8/1960 | Hoff et al. | 30/387 |

Primary Examiner—Othell M. Simpson
Assistant Examiner—Roscoe V. Parker
Attorney, Agent, or Firm—Bernard & Brown

[57] ABSTRACT

A system for aligning and regapping the guide grooves on a chain saw guide bar which includes a suitably adapted handheld swaging tool uniquely designed to return bent or worn guide grooves to the correct position and separation. The swaging tool contains a gauge which is adapted to fit in the center of the bar guide groove and a pair of swaging plates which are adapted to force the walls of the bar guide groove into proper relationship with one another upon the application of force to the swaging tool. The system may optionally further include a bar file guide which is adapted to file the peripheral edges of the chain saw bar.

12 Claims, 5 Drawing Figures

CHAIN SAW BAR GUIDE ALIGNMENT SYSTEM

BACKGROUND OF THE INVENTION (1) Field of the Invention

This invention relates to a system for aligning and gapping the guide grooves on a chain saw guide bar.

(2) Description of the Prior Art

One of the functions of a chain saw guide bar is to provide a track or guide groove in which a chain carrying the cutting teeth of the saw may freely travel when the saw is in operation. This track or guide groove extends along the outer edges of the chain saw bar and is designed to be of sufficient width and depth to provide both adequate clearance and rigid channeling for the drive links which are generally located on the inside of the chain opposite the cutting teeth.

In the normal course of wear, the walls of the guide groove can become unevenly worn; the guide groove can become misaligned; and the interior walls of the guide groove can become abraded, thereby disrupting the gap attitude and spacing necessary for efficient and effective channeling of the chain drive links. This condition is particularly common where the saw bar or chain has been previously filed improperly, where the saw has been run with insufficient lubrication, or where the wood being cut contains a excessive amount of dirt. This lack of proper alignment of the gap or proper sidewall height or spacing of the guide groove can cause excessive wear on one side of the saw bar groove guide, causing the saw to cut in an arc rather than in a straight line. This condition can cause the saw chain to bind and may in turn prevent the chain saw from completing the saw cut as intended.

The chain saw bar guide alignment system of the instant invention provides a repair system which will enable the user of a hand-held chain saw to align and regap the chain saw bar guide easily and quickly. The invention also provides a kit comprising a swaging tool and a file guide which will enable the user to align and regap the chain saw guide.

SUMMARY OF THE INVENTION

The invention relates to a chain saw bar guide alignment which includes a hand-held portable swaging tool and which may also include an equally portable file guide and a method for its use. When properly fitted on a chain saw bar and struck with an ordinary hammer or other similar means, the swaging tool can return bent or worn groove guides to their correct position and separation. The tool contains a movably mounted gauge, which may be operated upon by a biasing means such as a spring; one end of the gauge is placed in the center of the bar guide groove. The tool also contains a swaging means which, when force is applied to the swaging tool, will bend the walls of the bar guide groove into proper relationship with one another and with the center of the groove. A bar file guide may also be used as part of the system. By using a standard bastard file in said guide, the edges of the saw bar guide may be flattened and "squared off". The file guide may be used either before or after the bar swaging tool has been employed to straighten and regap the groove. This filing will remove the effects of excessive wear or prior improper filing on the peripheral edges of the saw bar guide.

BRIEF DESCRIPTION OF THE DRAWINGS

A complete understanding of the invention may be obtained from study of the following detailed description of the devices and their use, and the appended drawings, in which.

DETAILED DESCRIPTION OF THE DRAWINGS

Figure 1:
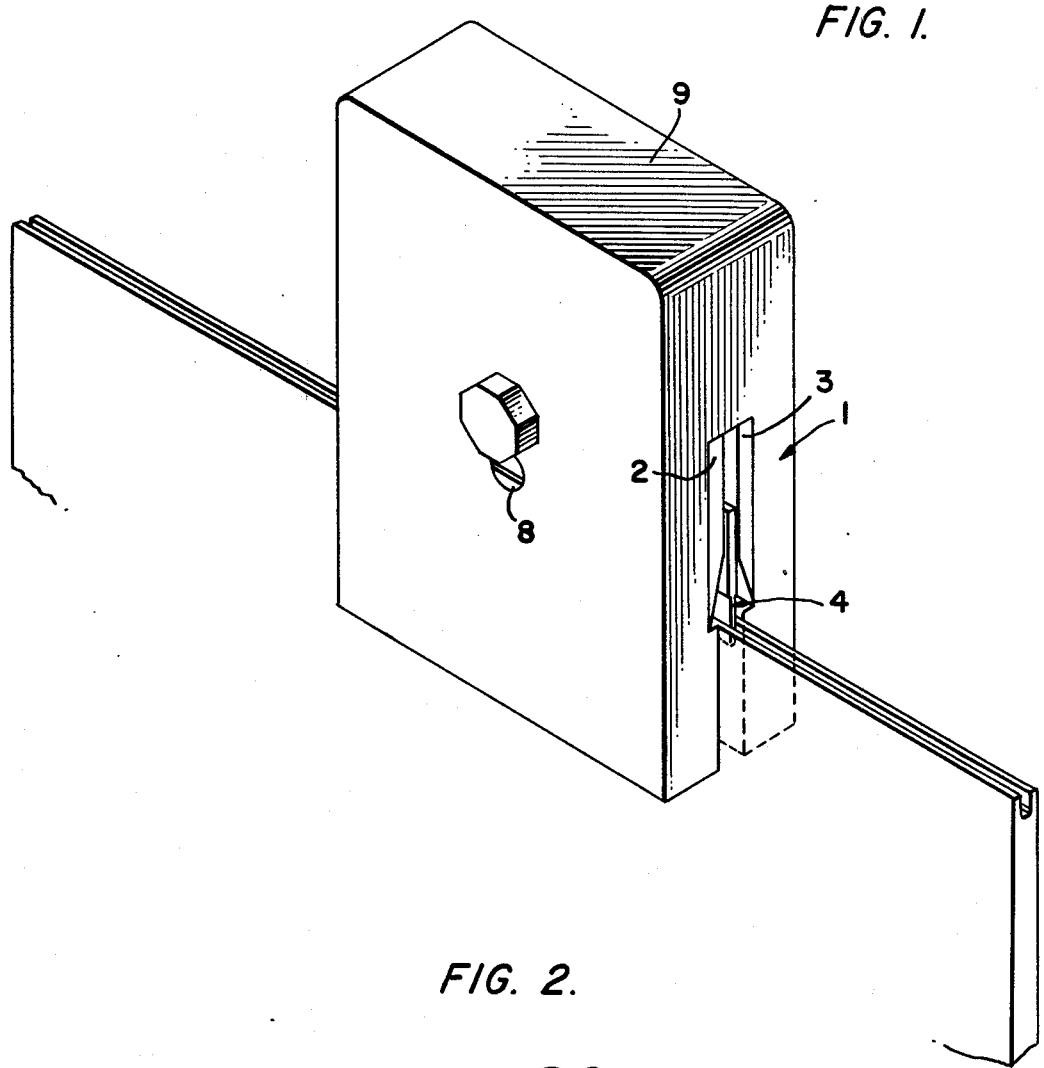
FIG. 1 is an oblique view of the chain saw bar guide swaging tool as seen in place on a chain saw bar.

The chain saw bar guide swaging tool consists of a U-shaped housing 1 shown in FIG. 1, housing an external striking surface 9 opposite the open end, and into which the actual swaging mechanism is mounted. This swaging mechanism consists essentially of a groove gauge 4 and a pair of swaging surfaces 2 and 3 in FIG. 1. Both the gauge 4 and the swaging surfaces 2 and 3 extend over the entire length of the housing 1. It has been found that the swaging surfaces as well as the tool housing and groove gauge should be made of a high quality tool steel in order to avoid deformation as a result of use. The swaging surfaces 2 and 3 may be permanently mounted to the inside of the housing 1 and may even be cast as part of the housing if desired. Alternatively, they may be removably mounted so that they could be replaced after a period of prolonged use. The swaging surfaces are positioned in such manner as to accommodate a chain saw bar of any practical width within their widest gap and to gradually taper that gap until the distance between their surfaces is substantially narrower than any chain saw bar commonly in use. Although the swaging surfaces may be flat or curved, it is recommended that at least the leading portion of the swaging surface be slightly curved to minimize the possibility of damage to the saw bar.

Figure 3:
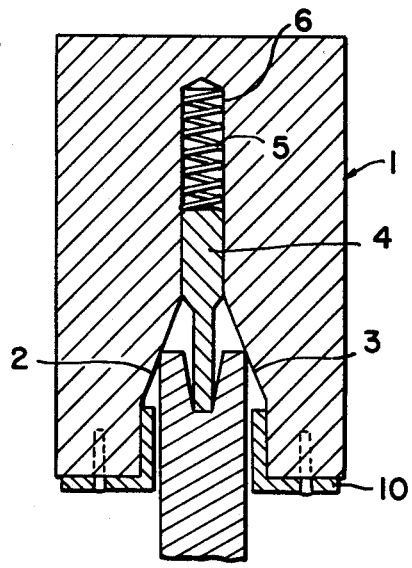
FIG. 3 is a cross-sectional view of the swaging tool as it is resting in position on a chain saw bar.
Figure 4:
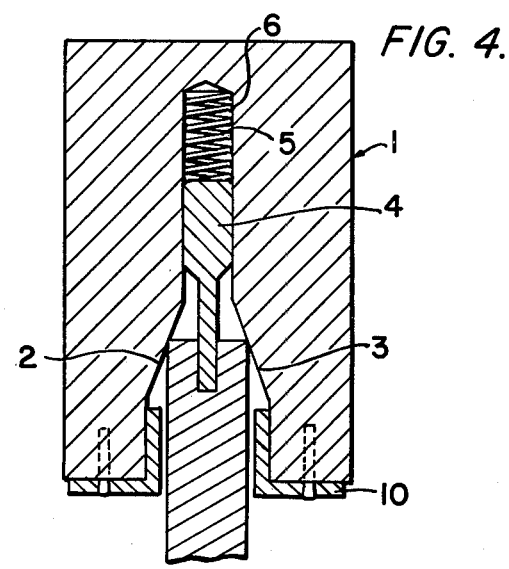
FIG. 4 shows the same view of the swaging tool as FIG. 3 except that the tool is shown at the moment a force is applied to the top of the swaging tool, say from a hammer blow, and the swaging surfaces are acting on the walls of the chain saw bar guide.

With respect to details of construction, the groove gauge is machined on one end, herein called the bar channel end, in such manner as to allow it to conform substantially to the bottom and sides of the chain saw bar channel as shown in FIGS. 3 and 4, with sufficient clearance along each channel wall to allow for insertion and removal of the groove gauge of from about 0.05 to about 0.001 inch, preferably 0.01 inch. The opposite end of the groove gauge, which fits inside the cavity 6 which houses the spring means, is machined to support and guide the groove gauge within the housing so it moves only in a direction along the action line of spring means 5 with minimum wobble. The groove gauge is held in place within the housing by bolt 8 which passes through an elongated aperture, not shown, near the center of the groove gauge. This aperture allows the gauge free movement along the action line of spring means 5. Any additional strengthening members thought necessary, such as bolt 7 used to prevent the jaws of the housing from spreading upon prolonged use, may also share this elongated aperture within the groove gauge.

Figure 2:
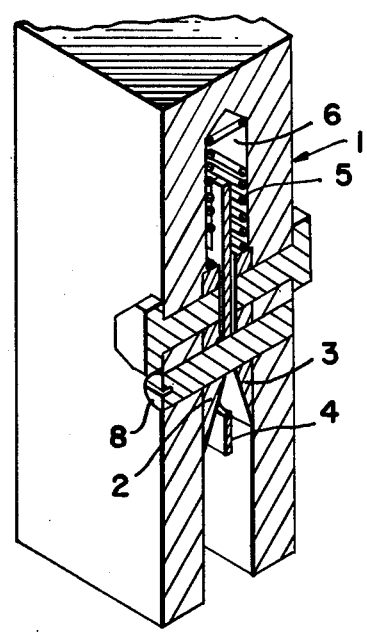
FIG. 2 is a vertical cross-sectional view of the swaging tool along the longitudinal axis of the bolts which run transversely between the jaws of the swaging tool.

Chain saw bars and bar guides are not necessarily standardized in size and some variation in saw bar length and width as well as guide channel and depth can be expected. To compensate for this, the bar gauge may be made in different widths so as to conform to the interior of the bar guide with the desired clearance. Changing the bar gauge can be accomplished by removing bolt 8 in FIGS. 1 and 2, sliding the existing gauge out of the tool, and replacing it with a gauge of different dimension. Replacing and tightening bolt 8 will then secure this different gauge and enable the user to use the tool on a saw bar of the new size. It is recommended that the slotted opening in the housing of the swaging tool be dimensioned to accommodate at least 63 gauge chain bar. The opening must allow the edge of the chain saw bar to pass into the cavity containing the swaging surfaces, yet be sufficiently narrow as to align and support the swaging tool without wobble when the tool is in place on the edge of the chain saw bar. If the clearance between the interior sides of the housing slot and the sides of the chain saw bar is too great to permit reliable alignment of the swaging tool on the edge of the chain saw bar, shims, inserts, or for example, other means such as those depicted as 10 in FIGS. 3 and 4 may be used or attached to the housing to prevent excessive wobble and allow proper alignment of the swaging tool with respect to the chain saw bar.

In practice, the tool is fitted over the edge of a saw bar, with care taken to ensure that the channel end of the groove guide is sitting squarely within the saw bar channel as shown in FIG. 3. For convenience, it is recommended that the saw bar be removed from the saw, and the saw bar placed in a vice. The top of the housing is then struck with a hammer or other similar means; this action causes the spring means 5 supporting the groove guide to collapse and permits the swaging surfaces 2 and 3 to impinge upon the top outside portions of the bar channel walls, as shown in FIG. 4. Upon application of such force, the swaging surfaces tend to direct these channel wall together, narrowing the channel, until the walls begin to pinch the groove guide. At this point, the guide prevents further narrowing of the channel gap and the tool may then be easily removed and placed on another segment of the bar in need of regapping.

When the tool is not in use or merely resting on the chain saw bar, the spring means 5 is of sufficient strength to extend the bar channel end of the groove gauge to a point preferably somewhat beyond the gap formed by the swaging surfaces, as shown in FIG. 3, or at least to a point wherein the gap formed by the swaging surfaces can accommodate a saw bar of relatively thick construction. When in use, however, the tool is struck on the top or striking surface of the housing 9 and the spring means 5 and spring cavity 6 must be designed to allow the bar channel end of the groove gauge to pass upward through the cavity formed by the swaging surfaces, to a point approximately adjacent to the narrowest part of this swaging cavity, or at least to a point which would allow a saw bar of thin construction to be acted upon by the swaging surfaces while the groove gauge remains in place in the saw bar channel. Such spring means, however, is not essential to utilize the tool; gravity or some other means may be used to aid in operation of the groove gauge.

Figure 5:
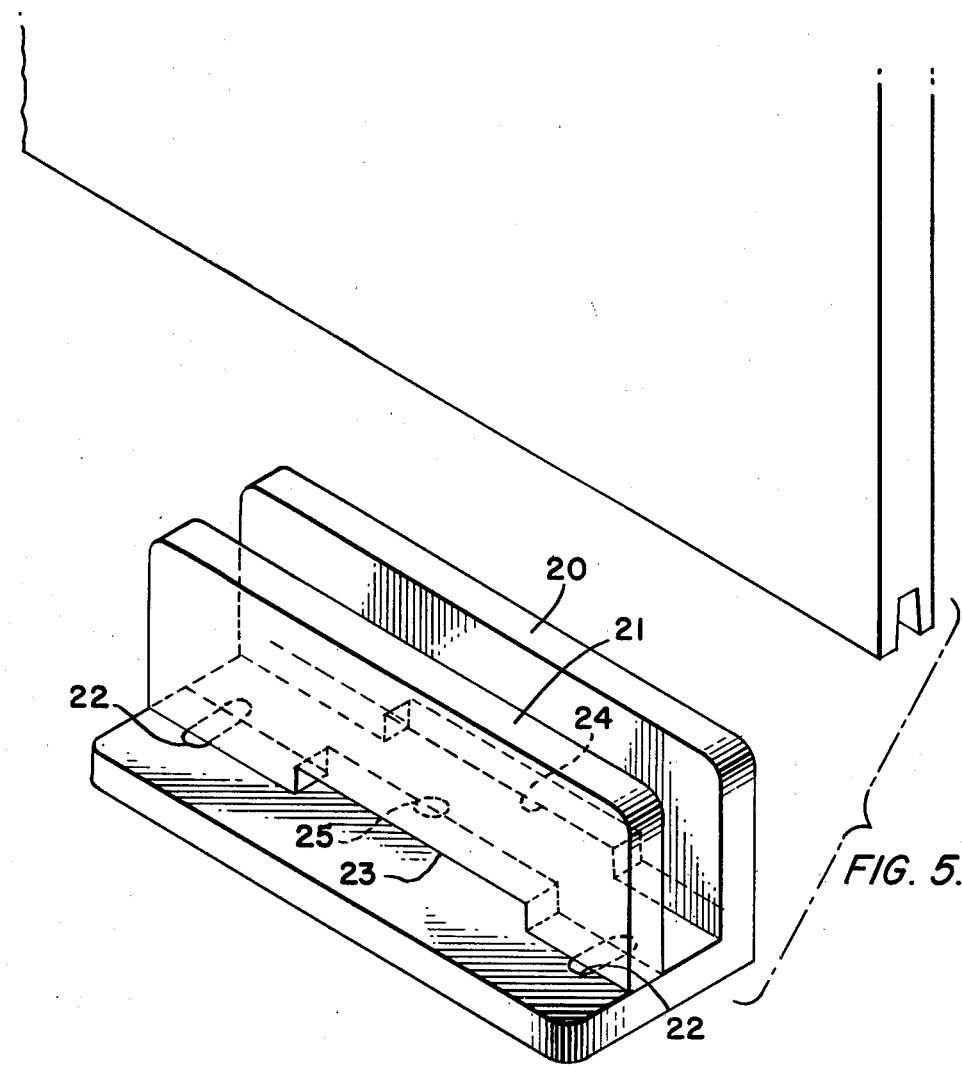
FIG. 5 is an oblique view of the chain saw bar file guide shown just before being placed on the chain saw bar.

In order to ensure that the chain saw chain will be correctly supported by the saw bar and that the saw bar guide will properly contain and control movement of the chain, it may be necessary to flatten and "square off" the top of the bar guide. This may be easily and quickly accomplished through the use of the chain saw bar file guide, as shown in FIG. 5. This file guide consists essentially of an L-shaped bracket 20 which a movable plate or guide 21 adjustably mounted parallel to one of the bracket sides so as to form a channel. The width or spacing of this channel may be made adjustable through the use of set screws in the base of the guide which can secure the guide to the floor of the bracket via elongated apertures 22 and threaded apertures along the lower edge of the movable plate, not shown, or through other means. This bracket channel may then be made to fit snugly along the edge of the chain saw bar of any size while allowing the filing guide as a whole to slide unimpeded along the length of the bar.

At the base of the adjustable guide 21 a slot 23 is cut, and a corresponding slot 24 is cut through the face of bracket 20 directly opposite. This slot is to accommodate a hand file, which in turn may be secured to the file guide, for example, by way of pressure exerted by a set screw through threaded aperture 25 in the base of the bracket.

In operation, the screws or other adjustment means in the adjustable plate are loosened, and the guide is placed on the chain saw bar in the relative position indicated in FIG. 5. The adjustable plate is placed firmly against the bar but not so firmly as to prevent free movement of the guide along the length of the bar. If desired, special bearing surfaces may be incorporated on the guide to facilitate movement between the guide and the surface of the saw bar. The screws or other adjustment means are then tightened or fixed and a hand file is inserted through the slots 23 and 24. The set screw in threaded aperture 25 is then tightened and the file and file guide act as a single tool. The guide may then be pushed the length of the saw bar in alternate directions using the file as a convenient handle. By continuing this process the edge of the bar guide may be filed until it is sharp and flat, and essentially perpendicular with respect to the bar guide. This procedure may be done either before or after the swaging tool has been used with good results. The guide may be easily removed after loosening the set screws associated with apertures 22 and making appropriate adjustment of the movable plate or guide. The file guide by its inherent design, will adjust to a wide range of chain saw bar sizes.

I claim:

1. A system for aligning and regapping a guide groove on a chain saw guide bar which includes a swaging tool comprising:
    a U-shaped housing defining a longitudinal cavity, said housing having a striking surface;
    a groove gauge which is movably mounted in said housing and which is adapted to fit into said guide groove and to conform said guide groove to its proper dimensions; and
    a set of swaging surfaces positioned in said longitudinal cavity in such a manner as to engage the peripheral edges of said chain guide bar when downward force is applied to the striking surface of the said housing, forcing the guide groove in said bar against said groove gauge.

2. The system of claim 1 which further includes a chain saw bar file guide which comprises an L-shaped bracket, a movable plate adjustably mounted on said bracket so as to form a channel through which said chain saw guide bar may pass, a slot in said guide designed to accommodate a file and a means for securing said file in said slot during movement of said guide relative to said chain saw bar guide to regrind the peripheral edge of said guide bar.

3. A system as recited in claim 1, wherein said groove gauge conforms substantially to the bottom and sides of said chain saw guide bar groove.

4. A system as recited in claim 1, wherein the opposite end of said groove gauge is designed to support and guide the gauge within said housing such that when force is applied to said striking surface said gauge will retract relative to said guide groove permitting the swaging plates to engage the peripheral edges of said chain saw guide bar thereby forcing the guide grooves to conform to said guide gauge.

5. A system as recited in claim 1, wherein said groove gauge is mounted on a biasing means which is designed to permit said groove gauge to extend in said housing to a point wherein the gap between said swaging surfaces can accommodate a saw bar of relatively thick construction, and when force is applied to said striking surface, said biasing means will permit said groove gauge to retract at least to a point such that a saw bar of relatively thin construction can be acted upon by said swaging surfaces.

6. A system as recited in claim 1, wherein said groove gauge is removably mounted in said housing so that said groove gauge may be replaced by another gauge of different dimensions to compensate for variations in the dimensions of different chain saw guide bars and the guide grooves therein which may require aligning and regapping.

7. A system as recited in claim 1, wherein a means of adjustment is provided near the mouth of said U-shaped housing on said swaging tool to provide compensation for said housing for different dimensions of said chain saw guide bar to be acted upon.

8. A system as recited in claim 1, wherein said swaging surface are positioned within said housing in such manner as to define a gradually tapering gap which will accommodate said chain saw guide bar, said gap being further defined in that the distance separating the swaging surfaces from each other narrows in dimension within said housing until it reaches a width that is at least narrower than the width of any chain saw bar commonly in use, but wide enough to permit said groove gauge to pass therethrough.

9. A system as recited in claim 1 wherein said swaging surfaces are flat.

10. A system as recited in claim 1, wherein said swaging surfaces are curved.

11. A system as recited in claim 1, wherein said swaging surfaces are replacably mounted in said housing such that they may be replaced after a period of prolonged use.

12. A system for aligning and regapping a guide groove on a chain saw guide bar which includes a swaging tool comprising:
- a U-shaped housing containing a longitudinal cavity, said housing having a striking surface;
- a set of swaging surfaces positioned within said housing in such manner as to define a gradually tapering gap;
- a replaceable groove gauge located within said housing, one end of said gauge being adapted to fit into said guide groove and to conform said guide groove to its proper dimensions, said gauge being movable to permit said guide gauge to extend in said housing to a point wherein the gap between said swaging surfaces can accommodate a saw bar of relatively thick construction, and when force is applied to said striking surface, said biasing means will permit said groove gauge to retract at least to a point such that a saw bar of relatively thin construction can be acted upon by said swaging surfaces.

* * * * *

UNITED STATES PATENT OFFICE
CERTIFICATE OF CORRECTION

Patent No. 4,191,074          Dated March 4, 1980

Inventor(s) William E. Sherman

It is certified that error appears in the above-identified patent and that said Letters Patent are hereby corrected as shown below:

Column 1, line 28, "a" should read --an--.

Column 3, line 43, "wall" should read --walls--.

Column 4, line 8, "which" should read --with--;

Column 4, line 65, after "chain" the word "saw" should be inserted;

Column 4, line 66, "the" second occurrence should be deleted.

Signed and Sealed this

First Day of July 1980

[SEAL]

Attest:

SIDNEY A. DIAMOND

*Attesting Officer*      *Commissioner of Patents and Trademarks*